(No Model.) 3 Sheets—Sheet 1.
J. B. STONER.
PNEUMATIC GRAIN ELEVATOR.
No. 489,340. Patented Jan. 3, 1893.
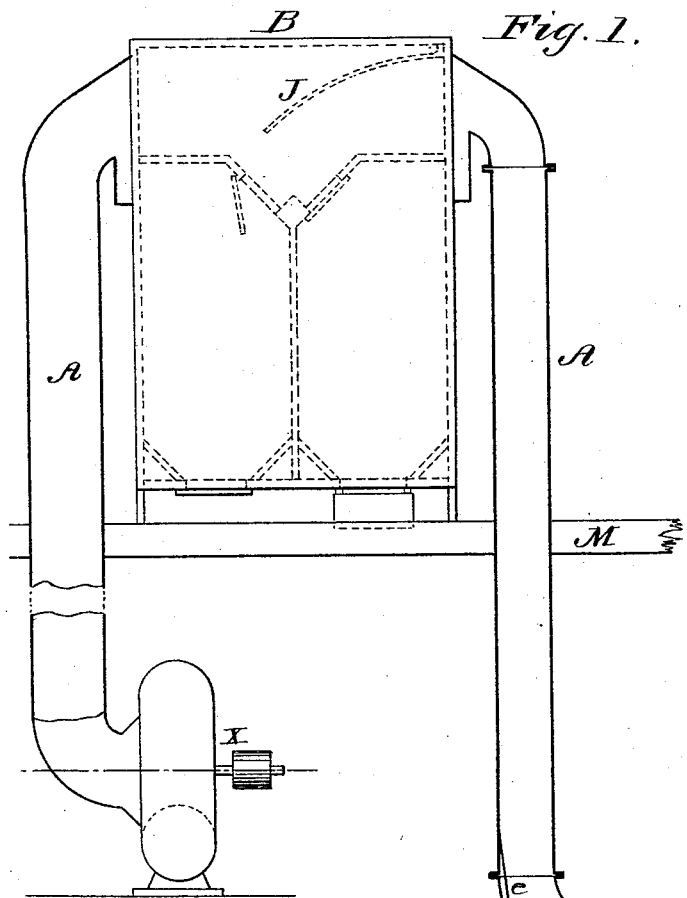
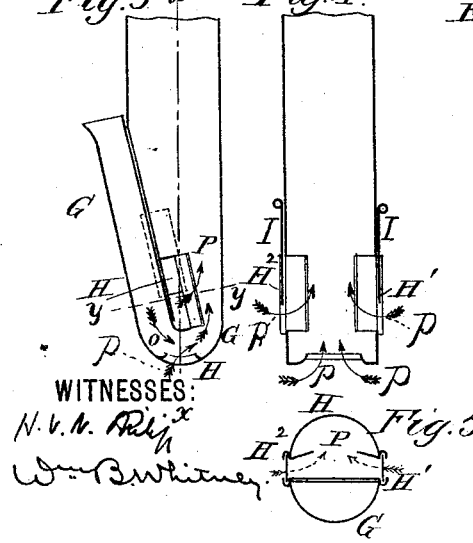
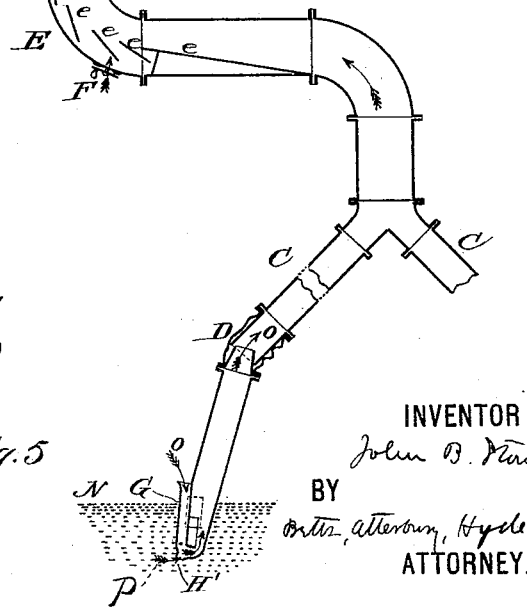
WITNESSES:
INVENTOR
John B. Stoner
BY
Orttr, Atterbury, Hyde & Britts
ATTORNEYS.

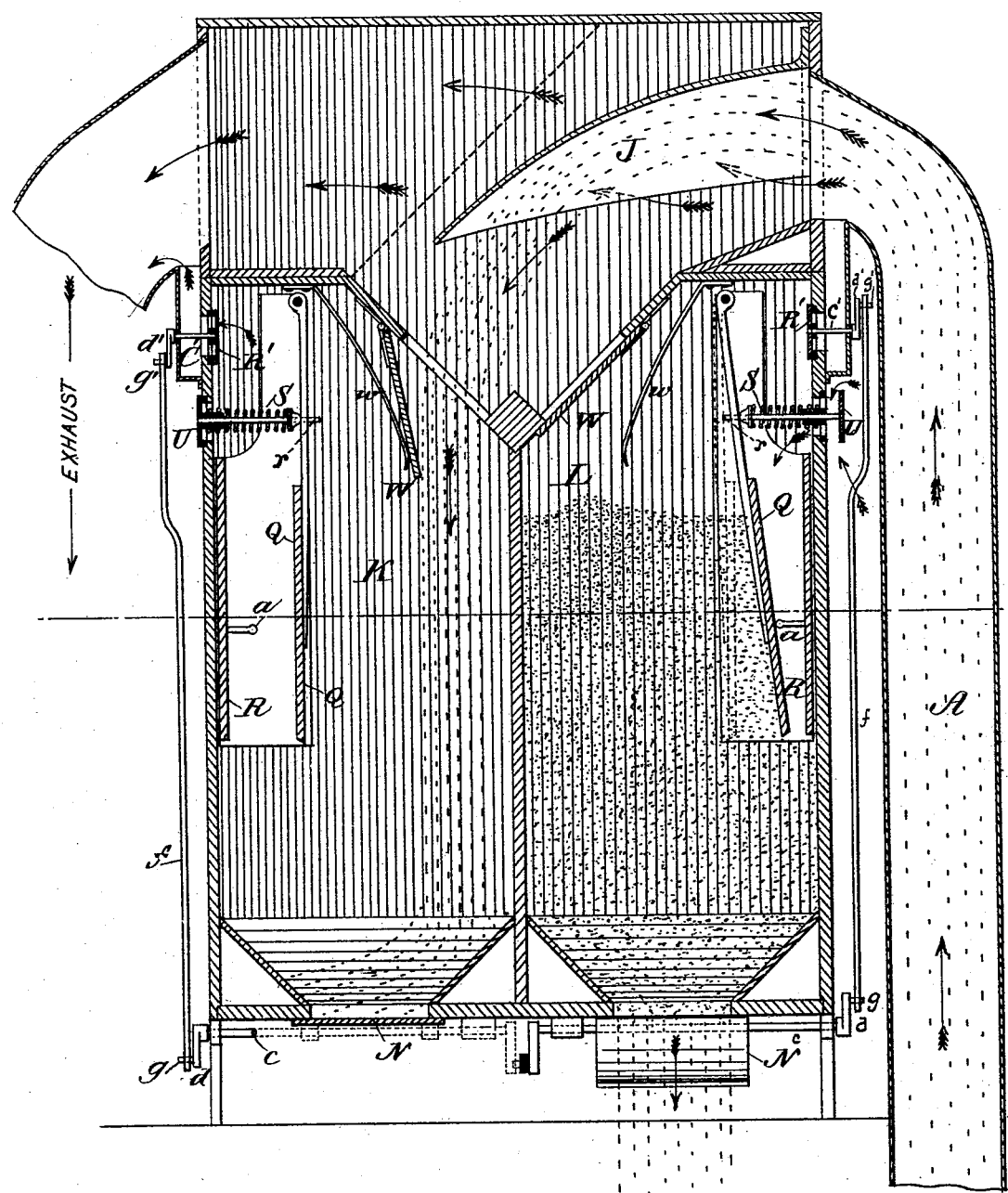

(No Model.)
3 Sheets—Sheet 3.
J. B. STONER.
PNEUMATIC GRAIN ELEVATOR.
No. 489,340.  Patented Jan. 3, 1893.
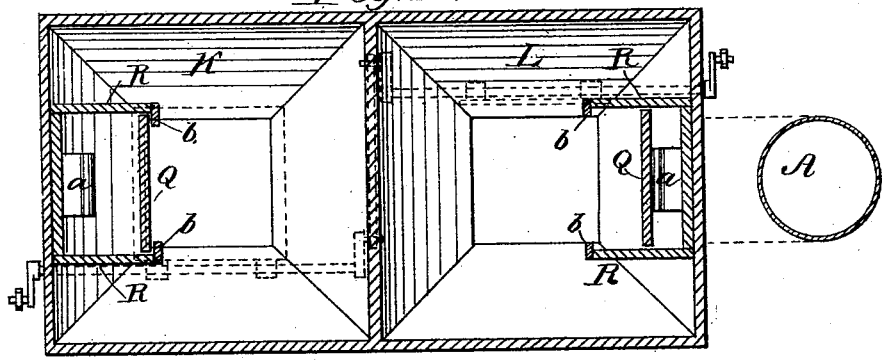
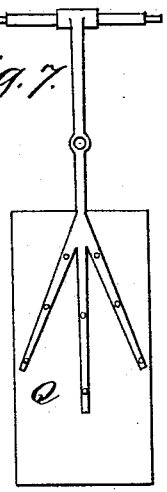
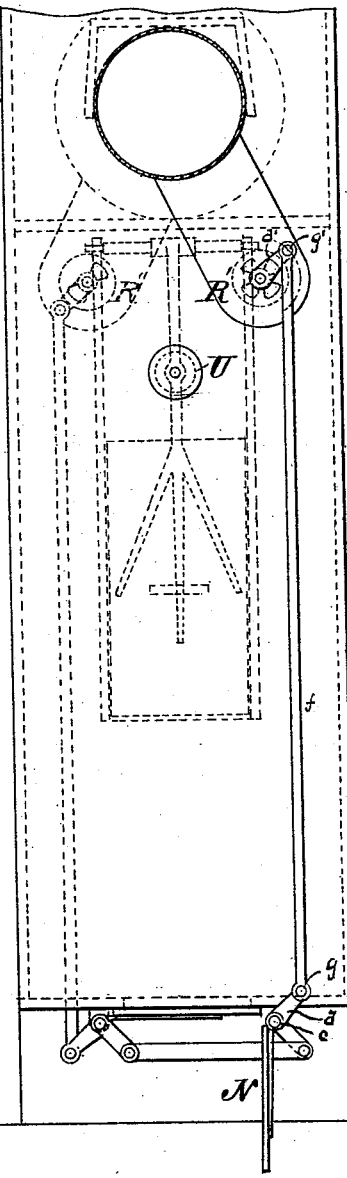
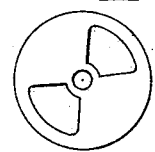
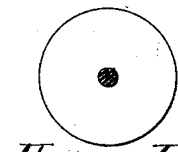
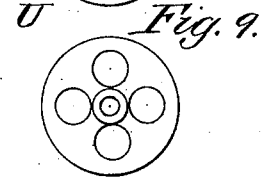
WITNESSES:
INVENTOR
John B. Stoner,
BY
Betts, attorney, Hyde & Betts,
ATTORNEYS.

UNITED STATES PATENT OFFICE.

JOHN B. STONER, OF NEW YORK, N. Y., ASSIGNOR TO CHARLES B. HILLHOUSE, OF SAME PLACE.

PNEUMATIC GRAIN-ELEVATOR.

SPECIFICATION forming part of Letters Patent No. 489,340, dated January 3, 1893.

Application filed August 26, 1891. Serial No. 403,760. (No model.)

*To all whom it may concern:*

Be it known that I, JOHN B. STONER, a citizen of the United States, residing at New York, in the county of New York and State of New York, have invented certain new and useful Improvements in Pneumatic Grain-Elevators, of which the following is a specification, reference being had therein to the accompanying drawings.

My invention relates to the class of grain elevators known as pneumatic, and the objects of my invention are to provide means of conveying the grain from one point to another in a continuous flow and a device in combination therewith for automatically receiving and discharging the grain so conveyed to it.

To this end my invention consists, first, of an improved pneumatic tube having any suitable exhaust mechanism and a device for creating and maintaining a current of air at the supply end of said tube when the same is immersed in grain; and second, of a hopper arranged at the point of delivery of said tube and provided with compartments and valves so that it will receive and deliver the grain automatically. I attain these objects by the mechanism illustrated in the accompanying drawings, in which similar letters of reference refer to similar parts throughout the various views.

Figure 1 is a front elevation showing the several parts assembled. Fig. 2 is a vertical sectional view, showing the hopper and a portion of the tube. Figs. 3, 4 and 5 are enlarged detail views of the device for creating and maintaining a current of air at the supply end of the tube. Fig. 6 is a side elevation showing the device for automatically operating the valves of the hopper. Fig. 7 is a detail view of the push-board. Fig. 8 is a detail view of the valve R'. Fig. 9 is a detail view of the valve U, and Fig. 10 is a plan view of the hopper.

Referring to Fig. 1, M is the support of the hopper and the place to which the grain, N, is to be conveyed. A is a pneumatic tube communicating between its point of supply in the grain N and its exhaust mechanism X with the hopper B. The exhaust mechanism X may be any suitable device, such as an exhaust fan, for producing a strong current of air through the tube A in the direction indicated by the arrows O. The supply end of the tube may be constructed with one or more branches, C, two being shown in the drawings. Each branch C may be rendered flexible by means of a flexible joint to facilitate the access of the tube to the grain. A rubber tube D fitting tightly over the adjoining ends of two parts of said branch C is a good form of such flexible joint. If it is necessary that said tube A should be bent in its course from the grain to the hopper as for instance as shown at E, the grain is apt to strike against the opposing wall of the tube, lose its momentum, collect at the bend, and tend to clog up the tube. To overcome this difficulty I arrange a series of inclined surfaces $e$, so that the advancing grain will glance from one to the other onward in its course.

One of the principal features of my invention is the device at the supply end of the tube shown in Figs. 1, 3, 4 and 5 and which I will now proceed to describe.

It has been found that the conveying or elevating of the grain or other substance by means of a pneumatic tube is best performed when a current of air is admitted to the tube with the grain, thus establishing a current of air which co-operates with the atmospheric pressure in conveying the grain. If the tube is simply inserted into the grain without any means of supplying more air than is naturally admitted with the grain, the tube will clog up, and if the grain is admitted to the elevating tube only at the point where such a current of air is admitted, the tube is still apt to clog up. I avoid this difficulty by providing places for the entrance of the grain to the tube so that it drops or falls into the rising current of air. Upon the supply end of the tube A or upon the supply end of each of its branches C, I arrange a small tube G or any suitable device through which air free from grain may be admitted into the tube A at its point of supply, and I provide openings H' and H² to the tube above the main supply point H; through which the grain may fall into the rising current of air and grain. Fig. 3 is an enlarged detail view showing this device. Figs. 4 and 5 are sectional views of the same taken respectively on the lines x—x and y—y of Fig. 3.

As shown in Fig. 1, I prefer to run the tube G back along the tube A so that the mouth of tube G will be above the grain when tube A is inserted therein.

H, H', H² are openings in the tube A for the admission of the grain. The side openings H' and H² are arranged with slides I for opening and shutting said openings according to the location of the grain and the amount thereof that it is desired to admit into tube A. At a bend in such tube as for instance at E, I sometimes provide an adjustable valve F. When this valve is opened a current of air will enter the tube at that point and increase the momentum of the grain after it has made the turn at E. This valve may be opened or not, being regulated according to the strength of the exhaust, the length of the tube between this bend and the hopper, &c.

Referring now to the remaining figures, J is a deflector arranged within the hopper B to prevent the grain from following the direction of the exhaust and allow it to drop down into the hopper through the swinging door W which normally rests against the brace w. Within the hopper are two compartments K and L for receiving the grain as it falls from the deflector J. The construction of these two compartments is the same and the several parts thereof are arranged to operate alternately. Within each compartment K and L is provided an independent means of operating the atmospheric valve, U, as follows: A push-board Q is arranged to swing in the frame R on a horizontal axis. The spring S holds said push-board Q normally in the position shown in compartment K, but when the compartment fills with grain to such an extent that the weight of the grain overcomes said spring S and the tension on the valve U, said push-board Q is forced back to the position shown in compartment L, the push-board Q being limited in its motion by the stop a and laps b of the frame R, and returning to its normal position by reason of spring S when the grain has left the hopper. The push-board Q bears a rod r which operates the valve U, so that when said push-board Q is in the position shown in compartment K, said valve is shut, and when said push-board is forced back by the grain, said valve U is opened. At the bottom of the compartment is another swinging door N, through which the grain falls from the hopper. Said door N operates the valve R' by means of shaft c journaled on the frame of the hopper, and turning with the opening of the door. Said shaft bears crank arm d connected by crank-pin g with rod f which is connected with valve R' by means of crank-pin g', crank arm d' and shaft c', so that the opening of said door N turns shaft c, pulls down rod f and turns shaft c', so as to shut valve R', shutting off the compartment from the exhaust. Shaft c is connected at its other end by means of similar crank arms, crank pins and rod, with shaft c of the door N of compartment L, so that the opening of the door N of one compartment shuts door N of the other compartment.

One of the principal features of my invention is the device described above, whereby the side pressure of the grain, as it fills one compartment of the hopper operates to connect such hopper with the atmosphere. This result has been accomplished heretofore by overcoming the pressure on the bottom door, N, by the weight of the grain in the compartment. Owing to the large area of the door N, the pressure to be overcome is very great, but in my device the pressure on valve U is very much less; and the operation of the device is thereby rendered much more certain.

The operation of the mechanism is as follows: The supply end of tube A being placed in the grain to be elevated and the exhaust mechanism being in operation, a current of air is established through tube A, as indicated by arrow O, Figs. 1, 3, and 5. This current of air with the atmospheric pressure, causes the grain to come into tube A, as indicated by arrows P, through the openings H, H' and H² and carries it up through tube A to the deflector J. Referring now to Fig. 2, the grain having lost its momentum, and the exhaust operating now through the greater dimensions of the hopper B, drops into compartment K, the swinging door W being open, the valve R' connecting compartment K with the exhaust being open, and the valve U connecting said compartment with the atmosphere being shut. When the grain has risen in the hopper so that its weight against push-board Q, overcomes spring S and the tension on valve U, said push-board is swung on its axis and valve U is opened. Through this valve U the air rushes in and at the same time the door W flies shut, and the door N drops open, shutting valve R'. In compartment L, door N is shut thereby opening valve R', valve U is shut, the tension on both sides of door W being the same, it drops open from its own weight; and the grain coming from tube A now drops into this compartment, and the grain in the compartment K is delivered; thus the compartments K and L alternately and automatically receive and deliver the grain conveyed by tube A.

What I claim and desire to secure by Letters Patent is:

1. In a grain elevator, a pneumatic tube connected with a suitable exhaust and having at its point of delivery a deflector and an enlarged area of exhaust for facilitating the delivery of the grain and at its supply end a device for preventing the clogging of the pneumatic tube, which consists of the tube G running from said point of supply in the grain to the atmosphere above the grain, and openings H' and H² in the pneumatic tube adapted to allow the grain to drop into a rising current of air free from grain, which is introduced into the pneumatic tube, at its supply end below said openings, from tube G, substantially as described.

2. In a pneumatic grain elevator, the tube G, for admitting air free from grain into the pneumatic tube at its supply end, and which runs from said point of supply in the grain to the atmosphere above the grain, and openings H' and H² in the pneumatic tube, above the point at which the air is admitted, adapted to allow the grain to drop into the rising current of air within the pneumatic tube, substantially as described.

3. In a pneumatic grain elevator, an automatic hopper for receiving the grain from the pneumatic tube and delivering the same, which consists of two compartments, each provided with a valve communicating with the exhaust and also a valve communicating with the atmosphere, a door at the top for receiving the grain, and a door at the bottom for delivering the same, and with means of opening said atmospheric valve by the pressure of the grain as it fills the compartment, and independently of the movement of the doors said parts in the compartment being arranged to operate alternately substantially as described.

4. In a pneumatic grain elevator, having a hopper comprising two compartments for alternately receiving and delivering the grain, each compartment being provided with a valve communicating with the exhaust and a valve communicating with the atmosphere, and also with a door at the top for receiving the grain and a door at the bottom for delivering the same, the device for opening said atmospheric valve in each of said compartments, which comprises a push board adapted to be moved by the grain as it fills the compartment so as to open said atmospheric valve, substantially as described.

5. In a pneumatic grain elevator, having a hopper comprising two compartments for alternately receiving and delivering the grain, each compartment being provided with a valve communicating with the exhaust and a valve communicating with the atmosphere, and also with a door at the top for receiving the grain and a door at the bottom for delivering the same, the device for opening said atmospheric valve in each of said compartments which consists of the combination of (1) push-board Q, (2) rod, r, and (3) spring S, substantially as described.

6. In a pneumatic grain elevator having a hopper comprising two compartments for alternately receiving and delivering the grain, each compartment being provided with a valve communicating with the exhaust and a valve communicating with the atmosphere, and also with a door at the top for receiving the grain and a door at the bottom for delivering the same, the device for opening said atmospheric valve, in each of said compartments, which consists of the combination of (1) push-board, Q, (2) rod, r, (3) spring, S, and (4) frame, R, having laps, b, substantially as described.

In testimony whereof I affix my signature, in presence of two witnesses, this 25th day of August, 1891.

JOHN B. STONER.

Witnesses:
WM. B. WHITNEY,
H. V. N. PHILIPS.